Oct. 5, 1937.  B. B. BACHMAN  2,094,976
MOTOR VEHICLE CONSTRUCTION
Original Filed June 16, 1934   2 Sheets-Sheet 1
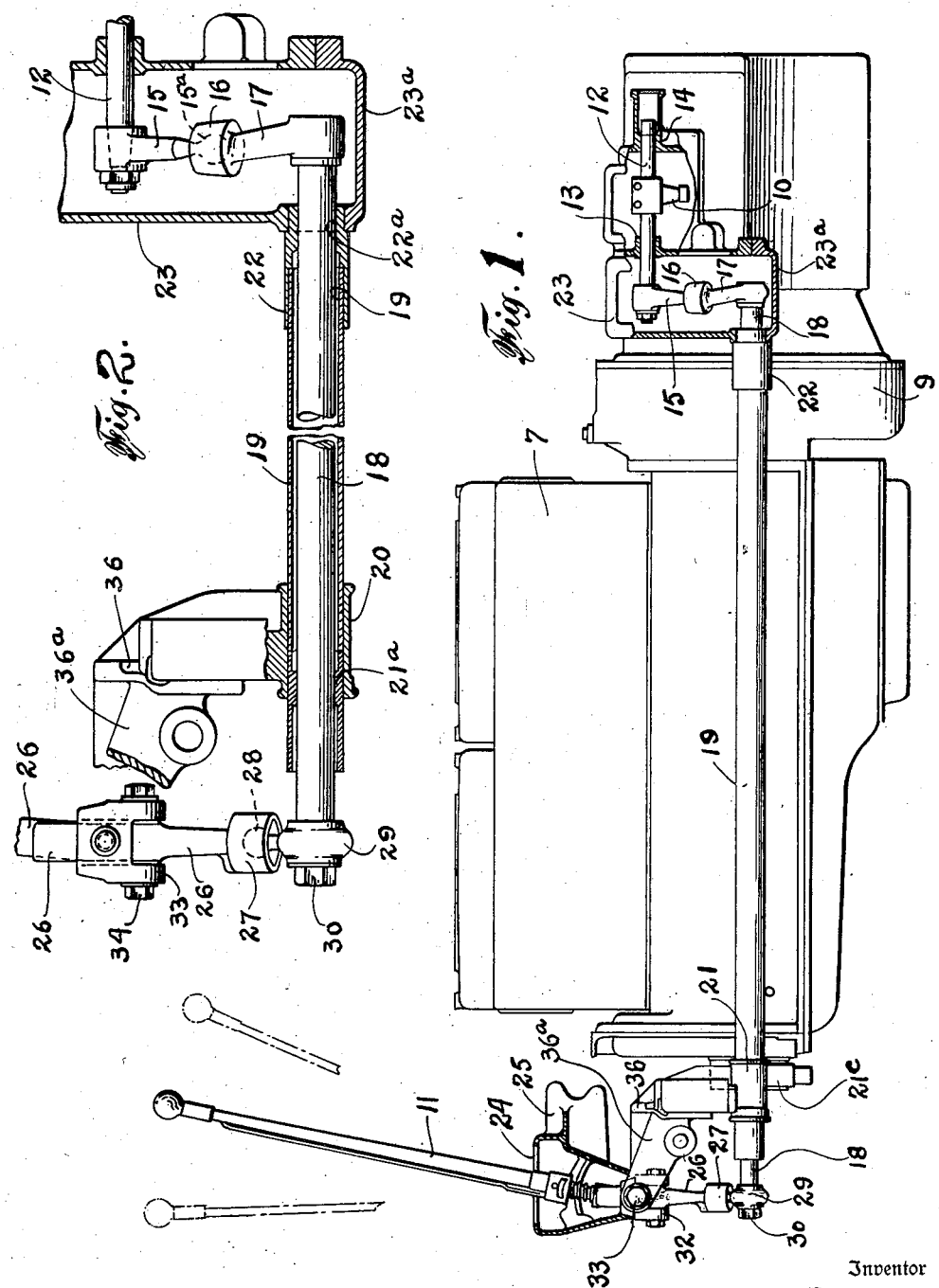
Inventor
Benjamin B. Bachman
P. Frank Hannah
Attorney

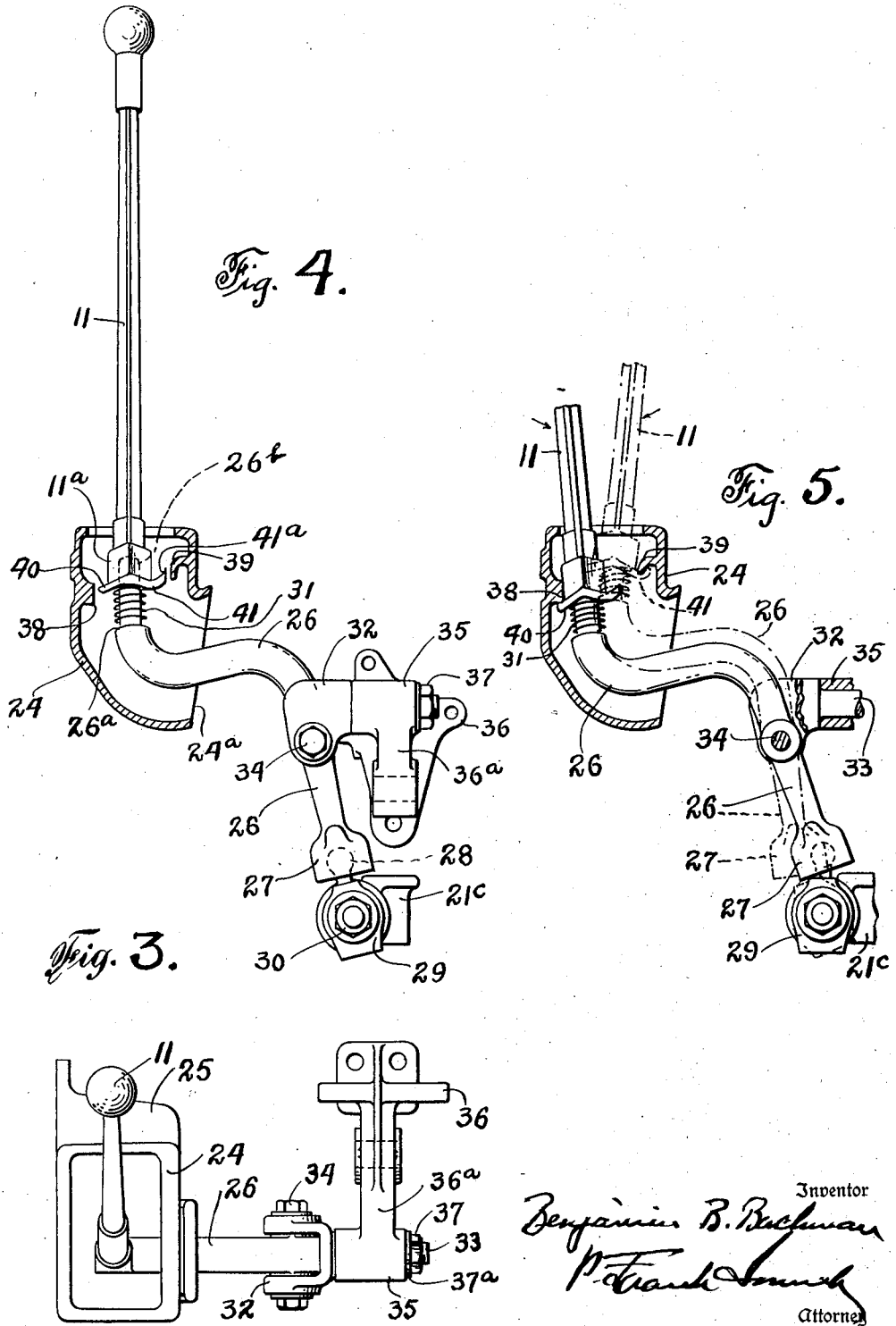

Patented Oct. 5, 1937

2,094,976

UNITED STATES PATENT OFFICE 2,094,976

MOTOR VEHICLE CONSTRUCTION

Benjamin B. Bachman, Philadelphia, Pa., assignor to The Autocar Company, Ardmore, Pa., a corporation of Pennsylvania Original application June 16, 1934, Serial No. 730,863. Divided and this application February 21, 1935, Serial No. 7,481

3 Claims. (Cl. 74—473)

This invention relates generally to gear-shifting mechanisms and is more particularly directed to means operable for conditioning a gear-set, as in an automotive vehicle, for functioning in a pre-selected speed, at a point remote or distant from such gear-set.

While this invention, as will become manifest from the following description, possesses a wide range of application in the automotive and other arts, for the purposes of this disclosure, I have elected to present it, as it may be practiced in the construction and operation of trucks and similar road vehicles, especially of those types wherein the engine is located within the cab or driving compartment, as, for example, that shown and described in my co-pending application for Letters Patent for Motor vehicles, Serial No. 730,863, filed June 16, 1934, in which the subject-matter hereof is disclosed and of which this application is a division.

In my said co-pending application, I have set forth the important objectives to which my invention, as disclosed therein, is directed. The location of the engine within the cab and beneath the driving seat, is a major factor in the attainment of these objectives, but, as will be obvious, it is also important that in order that a vehicle in which the engine is so mounted, may have the widest possible range of utility, the placement of the controls and their mode of operation should conform to standard practice.

Therefore, it is the object of this invention to provide a method and means of conditioning a gear-set of a conventional design, associated with the rear end of an engine, for functioning in a pre-selected speed, from a point remote or distant from the gear set.

It is also an object of my invention to provide a mechanism for conditioning a gear-set, as set forth, which may be actuated by a hand-operated gear-selecting and shifting lever, or its equivalent, located in advance of the engine or at any other point in spaced relation to the gear-set and the gear-shifting elements thereof.

A further important object of my invention is to provide a remote control mechanism for functioning in conjunction with the standard type of gear-set, in which the gear selecting and shifting lever distant from the gear-set will actuate a slide-rod engaging element constituting a part of the gear-set assembly, for the performance of any of the several gear-selecting and shifting operations, the movements of the shift lever conforming to those of its conventional counterpart, as mounted on the standard gear-set housing, while those of the rod-engaging element correspond directionally to the movements of the slide-engaging toe integral with the usual shift lever.

Other objects and advantages flowing from the practicing of my invention, will become evident as the description proceeds and I would have it clearly understood that I reserve unto myself all rights to the full range of equivalents, both in structure and in use, to which I may be entitled under my invention in its broadest aspect.

In the accompanying drawings, I have illustrated a preferred form of my invention, which may be employed in the construction and operation of a vehicle in which the engine is located beneath the seat, as shown in my aforesaid co-pending application. However, as will be obvious, the use of this construction is not limited to this particular design of vehicle. Also, the invention may take other forms to meet requirements of production or use, within the purview of the appended claims.

In the drawings:

Figure 1 is a side elevation of the engine, with associated transmission or gear-set and the means remote therefrom, that I employ for performing the gear-selecting and shifting operations, the extreme fore and aft positions of the shift lever being indicated by dot-and-dash lines.

Figure 2 is an enlarged longitudinal section of the interconnected parts of the gear-set operating mechanism.

Figure 3 is a top plan view of the shifting lever and connections to the rockable and slidable shaft, which functions to transmit movements to the gear-selecting and shifting elements of the gear-set, and Figures 4 and 5 are sectional elevations, respectively, looking at the forward end of the engine, as in Figure 1, illustrative of the mode of operation of the gear shifting lever and of the connections between said lever and the aforesaid shaft, whereby the latter may be actuated in the several gear-selecting and engaging operations.

Referring now to the drawings in detail, in which like characters of reference are employed to designate similar parts in the several views, 7 indicates an internal combustion engine, the torque of which is transmitted to the work through a power line, including a gear-set or transmission 8, which is suitably mounted behind the engine in association with the usual clutch mechanism, enclosed within the housing 9. This gear-set 8 may be of any preferred type, that in the present instance providing for five forward speeds and reverse, and conforming generally to the structure of my co-pending application for Letters Patent filed December 22, 1932, Serial No. 648,330, which includes four shift rods or slides, each embodying a jaw engageable by the toe of a manually actuatable shifting lever, the lever being bodily movable on its longitudinal axis to increase its range of lateral arcuate movement, for conditioning the gear-set for functioning in the fifth forward speed and in reverse speed, this arrangement providing for a shifting diagram which corresponds generally to that followed in the use of the standard three and four speed gear-set.

Assuming that the engine is mounted within the area of the seat-box, as in the type of vehicle described in my co-pending application Serial No. 730,863, of which this application is a division, I provide for conditioning the gear-set in its several speeds at a point remote therefrom, as from the driving compartment of the cab, with the shifting lever located in its conventional position for convenient manipulation by the right hand of the operator seated behind the steering wheel of the vehicle. To this end, the gear-set assembly includes an auxiliary shift-rod engaging element 10, corresponding in function to the toe of the conventional shift lever, that is actuated into its various effective positions in response to complemental movements of the gear-shifting lever 11, as hereinafter set forth. Similarly, to its counterpart, integral with the standard shift lever, the aforesaid auxiliary toe 10 normally assumes an analogous position relatively to the shift-rod jaws, as it depends from its carrier rod 12, mounted for sliding and rotative movement in the housing bearings 13 and 14, in superposed relation and parallel to the plane in which the shift-rods having the usual fork connections to the slidable gears of the set are disposed. As will be noted, the rod 12 extends through the bearing 13 and carries a lever 15 terminating in a ball 15a seated in the socket 16 of the arm 17, which is fixed to the end of the shaft 18, the latter being housed within the tube 19, supported in a horizontal plane to the left of the engine and parallel to the crank-case wall thereof, for relative longitudinal and rotative movement.

In the present embodiment, the tube 19, at its forward end, is retained within a sleeve 20 preferably integral with the bracket or fitting 21, which may be rigidly supported laterally of the front end of the engine or in juxtaposition thereto, the rear end of the tube being telescoped into the sleeve 22 entered in the front wall of the extension 23 of the gear-set housing, this extension forming a well within which the co-acting lever 15 and arm 17, with the cooperating parts of their supporting media are enclosed, the sleeves 21 and 22 embodying, or embracing, bearing surfaces, as at 21a and 22a, within which the shaft 18 is movable relatively to its tubular housing as aforesaid.

In the mounting of the gear-set, with its driven shaft in alinement with the engine crank-shaft, as in standard practice, the housing, including the upwardly and forwardly projecting extension 23 thereof, is canted to the left on its longitudinal axis through an arc of approximately 45°, to admit of the disposition of the shaft housing tube 19 parallel to the engine, as explained, the portion 23a of the housing extension 23, within which the tube-receiving sleeve 22 is located, being laterally offset in alinement with the bracket 21c to obtain the requisite clearance, whereby the auxiliary toe 10 may function in response to the sequential movements of the interconnected rod 12 and shaft 18 and the cooperating lever 15 and arm 17, as hereinafter described.

The manually actuatable shifting lever 11, associated with the housing 24, corresponding in its general outlines to the conventional type of housing, and supported in advance of the front end of the engine 7, as by a bracket 25, or other suitable fitting, is telescopically connected at its lower end to an arm or lever 26 which embodies a socket 27 for the reception of the ball end 28 of the lug 29 fixed to the end of the shaft 18, for movement therewith, as by tapering the mating surfaces of the lug and shaft and threading the nut 30 on the end of the latter in engagement with the face of the lug, the head end of the arm or lever 26 being offset relatively to the socket end thereof, as by the curvature of the intermediate portion, as shown. A shoulder 26a is formed contiguous to the head end of the arm or lever 26, the portion 26a, thereabove, of reduced diameter, being entered in and providing a bearing surface for the complemental socket end 11a of the shift lever 11, which is supported from said shoulder by the interposed spring 31, this interconnection of the two levers 11 and 26, providing for their functioning as a unitary structure, in the fore and aft and lateral movements of the shift lever, while rendering the latter capable of longitudinal movement relatively to its supporting element, for the purposes which, hereinafter, will become apparent.

The aforesaid lever or arm 26, adjacent its lower end, is suitably mounted within the clevis or bifurcated end 32 of the fitting 33, for relative rotative movement, about the longitudinal axis of the connecting bolt 34, this fitting being entered in the bearing member 35 of the forward extension 36a of the bracket 36, for rotative movement on its longitudinal axis, the end of the stem or entering portion thereof being threaded to receive the retaining nut 37 cooperating with the washer 37a. The bracket 36 is adapted to be fixed, as by bolting, to any appropriate support, as to the engine bed or mounting.

As will be seen from Figures 4 and 5, the housing 24, which is provided with an orifice 24a to accommodate the lever or arm 26 throughout its range of movement in intersecting arcs, embodies laterally extending ribs or ways 38 and 39 on its side walls to cooperate with the lateral projections 40 and 41 on the shift lever 11, the rib 39 being undercut from end to end to form a groove or track within which the upturned end 41a of the shift lever projection 41 is adapted to travel, when engaged therewith, in response to the depression of the lever in opposition to the spring 31, and its movement to the left on the fulcrum of the arm 26. Conversely, the movement of the shift lever to the right, while depressed, will cause the projection 40 thereof to ride beneath the housing rib 38, it being apparent that when the lever 11 is in its normal or spring-supported position, as shown in Figure 4, the ribs or ways 38 and 39 function as stops to limit the lateral movement of the lever, the lever-carried projections 40 and 41 being disposed in the plane of the respective ribs with which they cooperate and riding therebetween. Obviously, any tendency to movement of the lever laterally beyond that defined by the stops, will be arrested as one or the other of the lever projections 40 and 41 abut thereagainst. The lever 11, in the full and dot-and-dash lines of Figure 5, is shown in its two extreme lateral positions, just described, with the cooperating projections and ribs engaged.

The shift-rods of the gear-set, as disclosed in my said application, Serial No. 648,330, are four in number and are adapted to be engaged by the auxiliary toe 10, the movements of which respond directionally to those of the shift lever in the selection and actuation of the rods. Assuming that the gears for the first forward speed are to be engaged, the shift lever is canted to the left, the arm 26 moving coincidentally therewith on its fulcrum 34, to rock the shaft 18, through the interconnected ball and socket members 28 and 27, and enter the toe 10 in the jaw of the appropriate slide-rod. The shift lever is then moved forwardly on the transverse axis provided by the fitting 33 to urge the shaft 18 rearwardly, this movement, of course, being transmitted through the arm 17 and lever 15 to the toe-carrying rod 12 to shift the gear-set rod with which it has been engaged as previously described. For conditioning the gear-set for functioning in its second speed ratio, the shift lever 11, is moved backward to effect the forward movement of the toe rod 12. For the third speed, the movement of the shift lever is to the right and forward, the shaft 18 rocking to the left and sliding rearwardly in response to the lever movements, this clockwise movement of the shaft 18 being translated into an anti-clockwise movement of the toe rod to enter the toe 10 in the slide immediately to the left of the slide for actuating the first and second speed gears, it being obvious that the dependent toe 10 will have an arcuate movement to the left, while in picking up the slide for the aforesaid first and second speed gears, its movement will be to the right. Movement of the shift lever to its rear limits on the right, will urge the slide with which the toe 10 is engaged forwardly to mesh the gears for fourth speed. As will be readily seen, the relative movements of the shift lever and the auxiliary toe correspond to those of the conventional shift lever and its integral toe; in other words, as the conventional lever is shifted or canted to the right, the toe thereof swings to the left and vice versa.

Now, when it is desired to condition the gear-set for operation in the fifth speed, the shift lever 11, is depressed against the spring 31, and pressed to the right to engage the lever projection 40, beneath the housing rib or way 38 which increases the radius of movement of the lever or arm 26 on its axis 34 and, likewise, increases the arcuate movement of the shaft 18 in a clockwise direction, which is translated into an anti-clockwise movement of the toe-rod 12, to increase the swing of the toe for entering into the jaw of the slide at the extreme left, meshing of the gears being then effected by the backward movement of the shift lever on its axis 33, with a concurrent forward movement of the shaft 18 and the toe-rod 12. To return the shift lever to neutral, it is depressed sufficiently to permit the disengagement of the projection 40 from the rib 38, whereupon it may be returned to its normally spring-supported position, relatively to the head-end of the lever 26. The movements of the shift lever for the meshing of the gears for the reverse speed, are downward on its longitudinal axis, to increase the arc of the anti-clockwise movement of the shaft 18, as the lever is canted to the left to bring the projection 41 thereof into engagement with the rib or way 39, the finger 41a of said projection riding in the groove of the way, as the lever is shifted backwardly, the selecting movement of the shift lever through the medium of the interposed shaft 18 and the interconnected arm 17 rigid therewith, and the lever 15 fixed to the toe-rod 12, being translated into an opposite radial movement of the toe 10 to enter the jaw of the shift rod at the extreme right of the series for its actuation forwardly in response to the like directional movement of the shaft 18 and the toe-rod 12. It will be noted, especially from the showing of Figure 4, that the depth of the socket 27 and its internal contour in combination with the ball end 28 of the lug 29, not only provide a universal joint between the lever and the shaft 18, but a connection that admits of the requisite relative axial adjustment of the lever, without resulting in lost motion between the parts. The interconnection of the arm 17 and the lever 15 of the toe-rod 12, also permits these members to have the range of radial movement that is essential to conform to the increase in the degree of the lateral movements of the shift lever.

From the foregoing, it will be manifest that I have provided a system for actuating the gear-shifting elements of a gear-set, at a point remote therefrom, wherein the movements of the shifting lever, selective and actuating, conform to those of the shift lever of the conventional type, the mechanism that I employ for transmitting the effort to the work, including means whereby there is a translation of the leverage force applied, into a counterforce for the performance of the work, the structure utilized being simple and extremely practical in its assembly and the manner in which it functions.

As will be evident, the invention is not only applicable to a vehicle of the type described in my aforesaid copending application, Serial No. 730,863, but to any other automotive vehicle, including air and marine craft, or to any stationary power plant, where, for one reason or another it is necessary or desirable to employ a remote control mechanism for conditioning a gear-set or an equivalent unit in the power line, to which my invention may be applied. Also, it will be understood that my invention may be utilized with the same advantages and degree of efficiency in the conditioning of a standard three or four speed gear set for functioning in any of its speeds, that is obtained by its association with a gear-set of the five speed forward and reverse type, as herein described, the lever 11 in such instances being a part of the lever 26 and the housing ribs and coacting projections on the lever that are employed for the additional speed positions being dispensed with or omitted. These, and other changes or modifications that may be necessary in attaining the several objectives to which my invention is directed, as hereinbefore set forth, fall within the spirit and scope of my invention, as hereinafter defined.

I claim:

1. The combination with a gear-set having a plurality of shifting rods, each embodying a jaw, of means for conditioning said gear-set for functioning in a preselected speed ratio, from a point in advance thereof, said means including a shaft mounted above and parallel to said shifting rods for sliding and rotational movement, a jaw-engaging element dependent from said shaft, a second shaft parallel to said first shaft mounted for longitudinal and rotative movement in forwardly spaced relation to said gear-set, means connecting said two shafts for conjoint longitudinal movement and relatively opposite rotational movement, a manually actuable lever mounted for fore and aft and lateral rocking movement and means connecting said lever below its mounting to said second shaft for relative movement, whereby a predetermined lateral movement of said lever will rotate said first shaft to effect the simultaneous movement of said jaw-engaging element in a direction corresponding to that in which the portion of said lever below its mounting moves, for entering said element in the jaw of one of said shifting rods, the engaged rod being slidable in response to the movement of said lever in a path intersecting that of its first movement.

2. The combination with an internal combustion engine having a gear-set associated with its rear-end embodying a plurality of parallel slidable gear-shifting rods, each being provided with a jaw, and means for conditioning said gear-set for functioning in a pre-selected speed ratio from a point in advance of said engine, said means including a shaft mounted above and parallel to said shifting rods for sliding and rotative movement, a jaw-engaging element carried by said shaft, a second shaft mounted parallel to the side of said engine for longitudinal and rotational movement, an arm fixed to each of said shafts, the respective arms being connected for relative movement, a lever mounted for arcuate fore and aft and lateral movement forward of said engine, means interconnecting said latter lever below its mounting and said second shaft for relative arcuate movement, whereby a lateral arcuate movement of said lever will rotate said first and second shafts in opposite directions and simultaneously rock said jaw-engaging element in a direction corresponding to that in which the portion of said shifting lever below its mounting moves, means for manually actuating said lever, said means being adjustable relatively to said lever means fixed to the lever mounting and means carried by said lever actuator adapted to cooperate therewith to limit the arcuate movement of lever in certain conditioning operations, said limiting means being rendered ineffective in response to a predetermined downward movement of said lever actuator, to increase the range of arcuate movement of said lever in other conditioning operations.

3. The combination with an internal combustion engine having a gear-set associated with its rear-end embodying a plurality of parallel slidable gear-shifting rods, each being provided with a jaw, and means for conditioning said gear-set for functioning in a pre-selected speed ratio from a point in advance of said engine, said means including a shaft mounted in the housing of said gear-set, above and parallel to said shifting rods, for sliding and rotative movement, a jaw engaging element fixed to and dependent from said shaft, a second shaft mounted parallel to the side of said engine for longitudinal and rotational movement, an arm fixed to each of said shafts, said arms being connected for relative opposite movement, a lever mounted for fore and aft and lateral rocking movement forward of said engine, said lever embodying a reversely curved head-portion above its mounting, means interconnecting the lower end of said lever and said second shaft for relative movement whereby a lateral movement of said lever will rotate said first and second shafts in opposite directions and simultaneously rock said jaw-engaging element in the direction of movement of the lower end of said lever, a housing for the upper end of said lever, an actuator for said lever resiliently supported therefrom, means projecting laterally from said actuator adapted to cooperate with means fixed on said lever housing to limit the rocking movement of said lever in certain gear-set conditioning operations, said limiting means being rendered ineffective in response to a predetermined downward movement of said actuator in opposition to said resilient supporting means to increase the range of lateral movement of said lever in other conditioning operations, the limiting means in the latter operations functioning to guide the fore and aft movement of the lever actuator.

BENJAMIN B. BACHMAN.